United States Patent [19]
Harada

[11] Patent Number: 5,442,267
[45] Date of Patent: Aug. 15, 1995

[54] DEVICE FOR CONTROLLING THE REVERSE ROTATION OF A MOTOR AND METHOD OF JUDGING TIME POINT WHERE THE MOTOR IS ACTUALLY ROTATED IN A REVERSE DIRECTION

[75] Inventor: Hiroyuki Harada, Osaka, Japan
[73] Assignee: Mita Industrial Co., Ltd., Japan
[21] Appl. No.: 76,428
[22] Filed: Jun. 14, 1993
[30] Foreign Application Priority Data Jun. 17, 1992 [JP] Japan .................. 4-158290
Jun. 17, 1992 [JP] Japan .................. 4-158291
Jun. 17, 1992 [JP] Japan .................. 4-158292

[51] Int. Cl.$^6$ ........................... H02K 27/20
[52] U.S. Cl. .................. 318/280; 318/281; 318/282
[58] Field of Search ............... 318/280–294, 318/799, 800, 646, 250–280, 685; 388/800–830

[56] References Cited

U.S. PATENT DOCUMENTS

| | | | |
|---|---|---|---|
| 3,924,721 | 12/1975 | Reynolds | 318/685 X |
| 4,367,435 | 1/1983 | Bailey et al. | 318/258 X |
| 4,542,633 | 9/1985 | Hirooka et al. | 318/282 X |
| 4,629,949 | 12/1986 | Senso | 318/257 |
| 4,670,694 | 6/1987 | Asai | 318/258 |
| 4,857,814 | 8/1989 | Duncan | 318/281 |
| 4,897,882 | 1/1990 | Pickering | 388/801 |
| 4,939,440 | 7/1990 | Burke | 318/646 |
| 5,323,097 | 6/1994 | Kiiski | 318/799 |

FOREIGN PATENT DOCUMENTS 327109 8/1989 European Pat. Off. .

OTHER PUBLICATIONS

Patent Abstracts of Japan, vol. 9, No. 27 (E-294) 6 Feb. 1985 & JP-A-59 172 993 (Hitachi Seisakusho KK) 29 Sep. 1984.

*Primary Examiner*—Paul Ip
*Attorney, Agent, or Firm*—Beveridge, DeGrandi, Weilacher & Young

[57] ABSTRACT

In a device for controlling the reverse rotation of a motor, output pulses of a detector connected to an axis of rotation of a motor are counted for each very small unit time period $\Delta t$ after a reverse rotation instruction is applied to the motor, and the speed N and the acceleration $\alpha$ of the motor are calculated for each very small unit time period $\Delta t$. It is judged that the motor begins to rotate in the reverse direction at the time point where the acceleration $\alpha$ is switched from the negative to the positive after the calculated speed N of the motor is not more than a predetermined reference speed Nth. In addition, when it is not judged that the motor is rotated in the reverse direction within a predetermined time period after a reverse rotation instruction is applied to the motor, it is judged that an abnormality occurs in the control device, so that the motor is stopped.

12 Claims, 8 Drawing Sheets

FIG.2A REVERSE ROTATION INSTRUCTION
FIG.2B SPEED
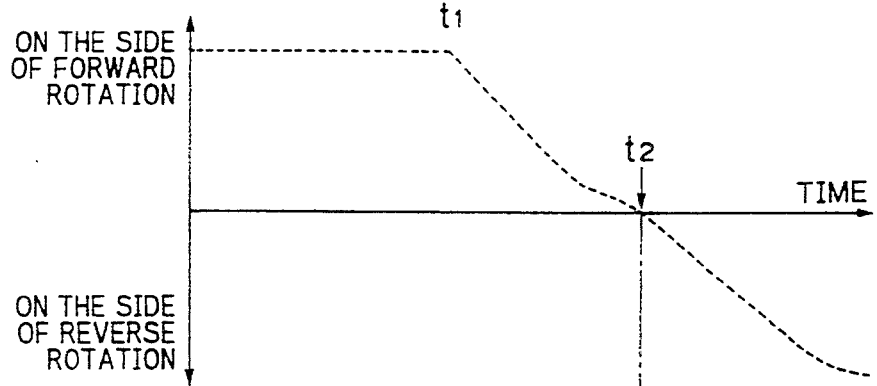
FIG.2C SPEED DATA
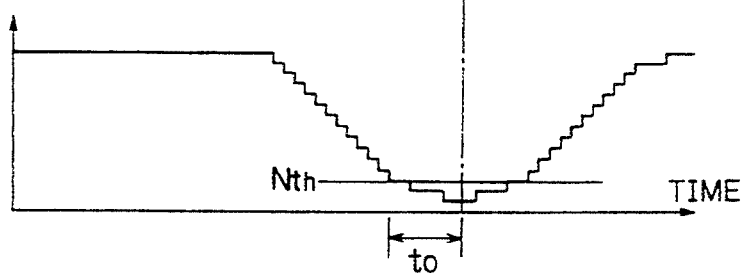
FIG.2D ACCELERATION DATA
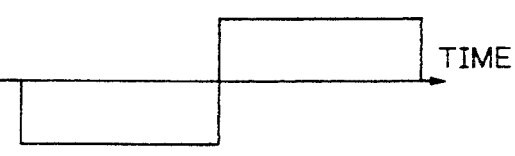
FIG.2E SPEED DATA
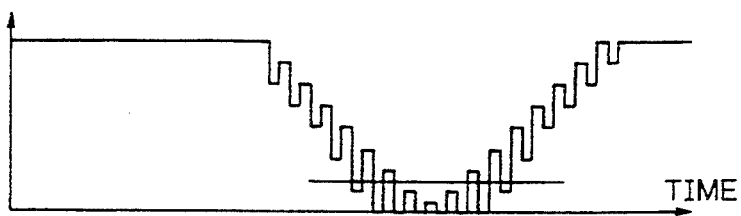
FIG.2F ACCELERATION DATA
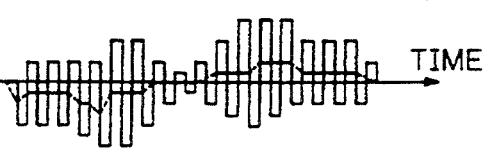

FIG.8A PRIOR ART
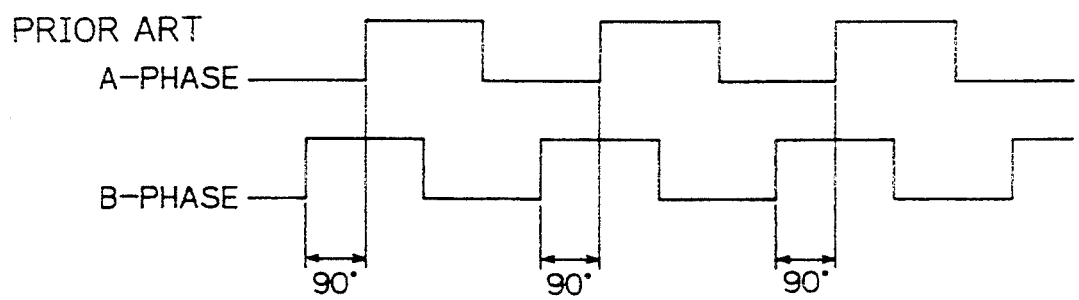
FIG.8B PRIOR ART → FORWARD ROTATION
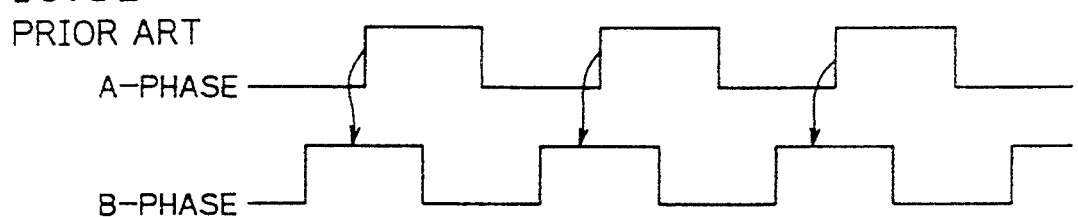
FIG.8C PRIOR ART ← REVERSE ROTATION
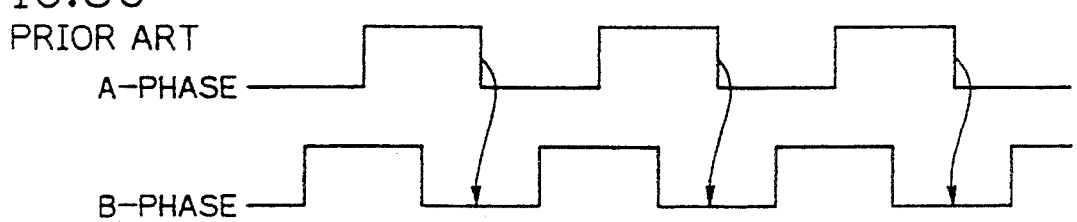

DEVICE FOR CONTROLLING THE REVERSE ROTATION OF A MOTOR AND METHOD OF JUDGING TIME POINT WHERE THE MOTOR IS ACTUALLY ROTATED IN A REVERSE DIRECTION

BACKGROUND OF THE INVENTION

1. Field of the Invention

The present invention relates generally to a device for controlling the reverse rotation of a motor and a method of judging the time point where a motor actually begins to rotate in the reverse direction, and more particularly, to a device for controlling the reverse rotation of a motor capable of accurately detecting, when the motor begins to rotate in the reverse direction, the time point where the motor begins to rotate in the reverse direction and a method of judging the time point where a motor is actually begins to rotate in the reverse direction.

2. Description of the Prior Art

For example, a motor for driving an optical system for illuminating and scanning a document in a copying machine, a facsimile or the like or a motor for driving an automatic document feeder mounted on a copying machine is rotated in a first direction to drive the optical system or a document conveying belt of the automatic document feeder in the first direction, while being rotated in a second direction at predetermined timing to drive the optical system or the document conveying belt in the second direction opposite to the first direction.

In the driving of the optical system and the driving of the document conveying belt, it is necessary to accurately control the position where driving is reversed. Therefore, it is necessary to detect the time point where the motor which is a driving source is actually switched from the forward rotation to the reverse rotation.

Meanwhile, a rotating motor has inertia. Even if a reverse rotation instruction signal is applied, therefore, the motor is not immediately switched from the forward rotation to the reverse rotation. There is a time lag between the time when the reverse rotation instruction signal is applied and the time when the motor is actually switched from the forward rotation to the reverse rotation. In the motor for driving an optical system or the motor for driving a conveying belt of an automatic document feeder, therefore, it is impossible to carry out control with high precision unless the time lag between the time when the reverse rotation instruction signal is applied to the motor and the time when the motor is actually switched from the forward rotation to the reverse rotation is accurately detected and reflected for control.

Examples of the conventional reverse rotation control of, for example, a motor for driving an automatic document feeder include control for detecting the time when a motor begins to rotate in the reverse direction which is described in Japanese Patent Laid-Open Gazette No. 174538/1986. In the control described in the prior art document, output pulses of an encoder connected to the motor are detected and the difference between time t1 when a reverse rotation instruction signal is applied to the motor and time t2 when an output of the encoder does not vary is found, thereby to detect a time lag T between the time t1 when the reverse rotation instruction signal is applied to the motor and the time t2 when the motor actually starts to be rotated in the reverse direction.

Furthermore, the control in the above described prior art document may be replaced with, for example, control using a two-phase type encoder outputting pulses 90° out of phase with each other in synchronism with the rotation of an axis of rotation of a motor, thereby to make it possible to accurately detect time when where the motor begins to rotate in the reverse direction.

In the two-phase type encoder outputting pulses 90° out of phase with each other, A-phase and B-phase pulses are generally outputted by the rotation of the encoder, as shown in FIG. 8A. There is a 90° phase difference between the A-phase pulses and the B-phase pulses. Therefore, at the time of the forward rotation of the motor, if the level of a B-phase signal is detected at the time point where the A-phase pulses rise, the level of the B-phase signal is, for example, high, as shown in FIG. 8B.

On the other hand, at the time of the reverse rotation of the motor, if the level of a B-phase signal is detected at the time point where the A-phase pulses rise, the level of the B-phase signal is, for example, low, as shown in FIG. 8C. Therefore, it is possible to accurately detect the forward rotation or the reverse rotation of the motor by detecting the level of the B-phase signal at the time point where the A-phase pulses rise.

In the control method described in Japanese Patent Laid-Open Gazette No. 174538/1986 out of the above described conventional control methods, a time lag T from the time when the reverse rotation instruction signal is outputted to the time when the actual reverse rotation is detected is relatively long, and the time point where the output of the encoder does not vary cannot be accurately detected. Therefore, this control method is not superior in precision as a control method of detecting the time point where the motor actually begins to rotate in the reverse direction.

On the other hand, in the control method using the two-phase type encoder outputting pulses 90° out of phase with each other, it is possible to accurately detect the time point where the motor actually begins to rotate in the reverse direction. However, the two-phase type encoder is high in cost. Moreover, the number of signal lines from the encoder must be two because the encoder is of a two-phase type. Accordingly, a device for controlling the reverse rotation of a motor is high in cost if the two-phase type encoder is used.

SUMMARY OF THE INVENTION

Therefore, an object of the present invention is to provide a device for controlling the reverse rotation of a motor having a simple structure and capable of detecting the time point where the motor actually begins to rotate in the reverse direction with high precision.

Another object of the present invention is to provide a device for controlling the reverse rotation of a motor capable of detecting the reverse rotation of the motor with high precision in a simple structure in which detecting means for detecting the rotating state of the motor is not a two-phase type encoder but a single-phase type encoder only outputting pulses of one type in synchronism with the rotation of the motor.

Still another object of the present invention is to provide a method of correctly judging the time point where a motor actually begins to rotate in the reverse direction.

A motor behaves as follows when the rotation thereof is switched from the forward rotation to the reverse direction. Specifically, if a reverse rotation instruction is given to a motor rotating at a predetermined speed, the motor starts to be decelerated according to the reverse rotation instruction. Finally, the speed of the motor becomes zero. Thereafter, the motor is accelerated in the reverse direction. Consequently, there is a time lag between the time when the reverse rotation instruction is outputted and the time point where the motor actually begins to rotate in the reverse direction.

According to the present invention, if the motor starts to be decelerated according to the reverse rotation instruction, the speed of the motor is calculated. The calculated speed of the motor is compared with a predetermined reference speed, for example, a sufficiently low speed. When the speed of the motor is not more than the reference speed, it is judged that the motor actually begins to rotate in the reverse direction. Consequently, it is possible to detect the time point where the motor actually begins to rotate in the reverse direction with high precision.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A, 2B, 2C, 2D, 2E, and 2F are waveform diagrams showing the relationship among a reverse rotation instruction, the actual speed of a motor, detected speed data and acceleration data of the motor in the motor driving and control device according to one embodiment of the present invention;

FIGS. 8A, 8B, and 8C are waveform diagrams for explaining the principle of detecting the forward rotation and the reverse rotation of a conventional two-phase type encoder.

DESCRIPTION OF THE PREFERRED EMBODIMENTS

One embodiment of the present invention will be described in detail with reference to the drawings.

Figure 1:
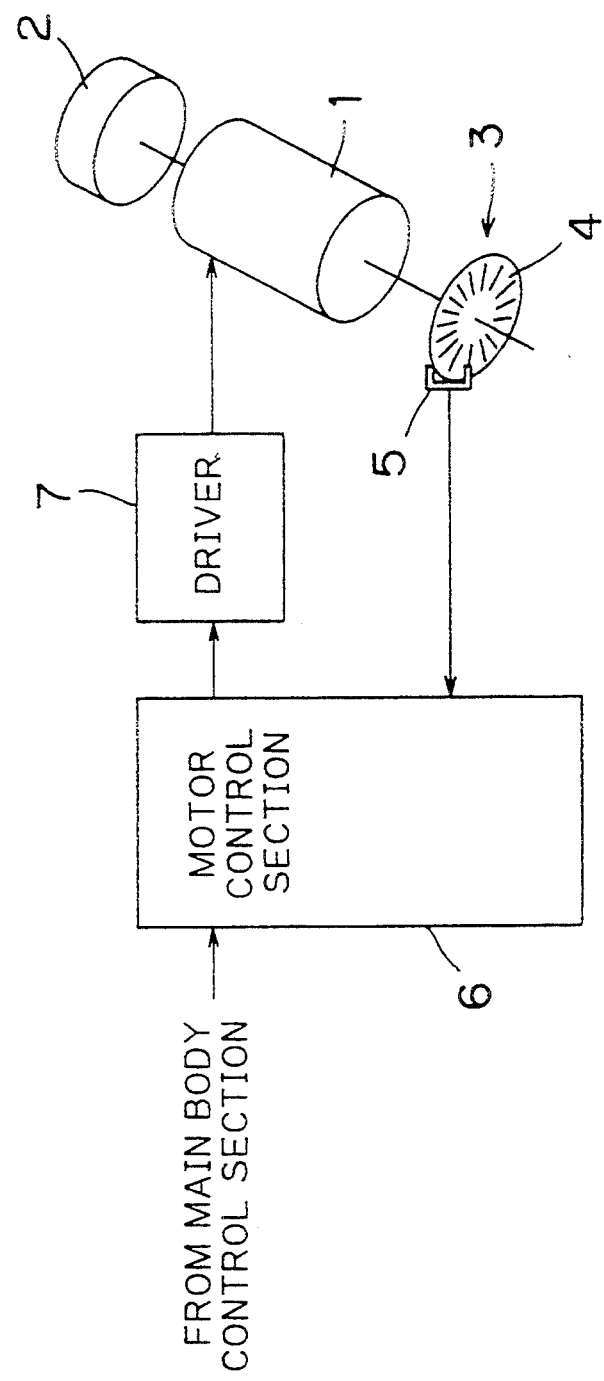
FIG. 1 is a block diagram showing the construction of a motor driving and control device according to one embodiment of the present invention.

FIG. 1 is a block diagram showing the construction of a motor driving and control device according to one embodiment of the present invention.

Referring to FIG. 1, a motor 1 is, for example, a DC servo motor and is for driving a load 2. A conveying belt of an automatic document feeder mounted on, for example, a copying machine may be considered as the load 2. In addition, an optical system for illuminating and scanning a document in the copying machine may be considered as the load 2. Furthermore, an arbitrary drivable member may be considered as the load 2.

A detector S for detecting the rotating state of the motor 1 is connected to an axis of rotation of the motor 1. The detector 3 is a single-phase type encoder which is constituted by a rotating disc 4 having a lot of slits radially, for example, formed therein and a photointerruptor 5 optically connected to the rotating disc 4. Such construction makes it possible to construct the detector 3 simply and at low cost. In the present embodiment, a total of 70 to 80 slits, for example, are radially formed in the rotating disc 4. Therefore, if the motor 1 is rotated once, 70 to 80 pulses are outputted from the photointerruptor 5.

The detector 3 constructed as described above may be replaced with another equipment for outputting pulses which are periodically synchronized with the rotation of the servo motor 1, for example, a frequency generator.

Output pulses of the photointerruptor 5 are applied to a motor control section 6. The motor control section 6 is provided with a microcomputer and a memory. The motor 1 is so controlled as to be rotated in the reverse direction and the time when the motor 1 actually begins to rotate in the reverse direction is detected by the motor control section 6.

A control signal of the motor control section 6 is applied to a driver 7. The motor 1 is energized by the driver 7.

FIGS. 2A, 2B, 2C, 2D, 2E and 2F are waveform diagrams showing the relationship among a reverse rotation instruction signal outputted from the motor control section 6, the actual rotation speed of the motor 1, and speed data and acceleration data detected by the motor control section 6 on the basis of the pulses outputted from the photointerruptor 5. As shown in FIGS. 2A and 2B, if the reverse rotation instruction signal is turned on, the actual speed of the motor 1 is gradually reduced from constant-speed of the forward rotation at that timing and finally, becomes zero at time t2. Thereafter, the motor 1 is rotated in the reverse direction from the time t2.

The actual speed of the motor 1 should be grasped ideally as stepped-shaped speed data as shown in FIG. 2C in the motor control section 6 on the basis of the detection pulses of the photointerruptor 5. In addition, the acceleration of the motor 1 should be grasped as shown in FIG. 2D ideally in the motor control section 6 on the basis of the detection pulses of the photointerruptor 5.

Figure 3:
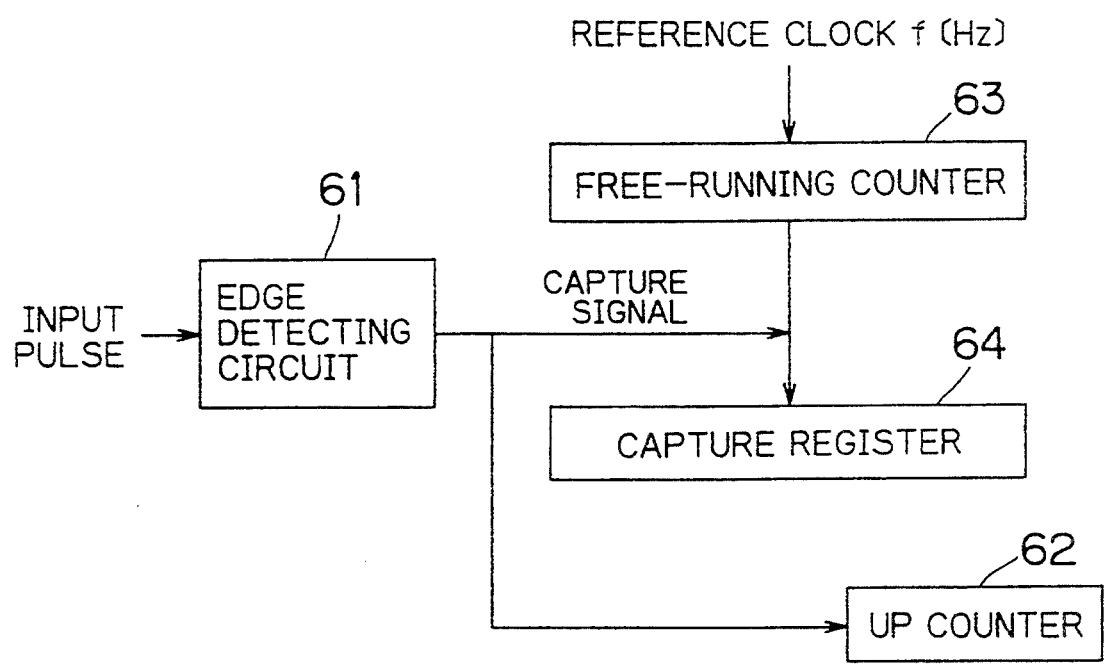
FIG. 3 is a block diagram showing one example of a circuit for calculating pulse width data in one embodiment of the present invention.
Figure 4:
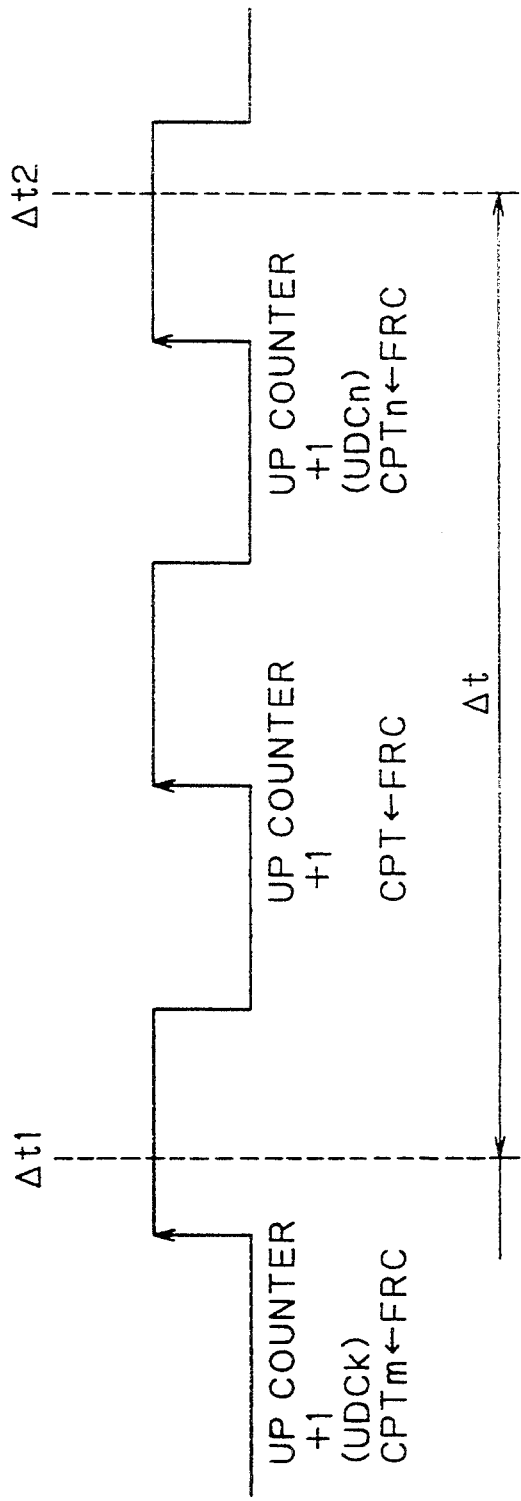
FIG. 4 is a diagram for explaining the principle of calculating pulse width data.

A circuit for calculating pulse width data CWDT of the photointerruptor 5 as shown in FIG. 3 is provided so as to calculate the data shown in FIGS. 2C and 2D in the motor control section 6.

Referring to FIG. 3, the pulses outputted from the photointerruptor 5 are applied to an edge detecting circuit 61. The edge detecting circuit 61 detects the leading edge, for example, of the applied pulses and derives its detection output. The detection output is applied to an up counter 62, to be counted.

Furthermore, a free-running counter 63 of, for example, 16-bit construction for counting reference clocks up is provided in the circuit for calculating pulse width data CWDT. The free-running counter 63 counts machine clock pulses of the microcomputer having a frequency of, for example, approximately 1.5 MHz as reference clock pulses.

On the other hand, an output of the edge detecting circuit 61 is applied to a capture register 64 as a capture signal. The capture register 64 uses the capture signal applied from the edge detecting circuit 61 as a trigger to read and hold the counted number of the free-running counter 63. Consequently, the contents of the capture register 64 are gradually updated by the output of the edge detecting circuit 61, that is, the leading edge of the pulses outputted from the photointerruptor 5.

Therefore, if UDCm is taken as the counted number of the up counter 62 at a certain time point Δt1, CPTm is taken as the counted number held in the capture register 64 at that time point, Δt1 UDCn is taken as the counted number of the up counter 62 at a time point Δt2 after an elapse of a very small unit time period Δt from the time point Δt1 and CPTn is taken as the counted number held in the capture register 64 pulse width data CWDT applied from the photointerruptor 5 is calculated by the following equation:

$$CWDT = \frac{CPTn - CPTm}{|UDCn - UDCm|} \quad (1)$$

Accordingly, the rotation speed N of the motor 1 is as follows:

$$N = \frac{1}{\frac{CWDT}{f} \times C} \times 60 \, [rpm] \quad (2)$$

where C is the number of pulses outputted from the photointerruptor 5 when the motor 1 is rotated once Although in FIG. 3, description was made of a case where the up counter 62 is used, the up counter 62 may be replaced with an up-down counter which is switched to the countdown if the reverse rotation of the motor 1 is detected. In the foregoing equation (1), the absolute value of the denominator in the right side is found in consideration of a case where the up-down counter is used.

Furthermore, the average acceleration for the very small unit time period Δt is found by the following equation:

$$\alpha = \frac{\text{speed change}}{\text{elapsed time}} = \frac{N - N'}{\Delta t} \quad (3)$$

where N' is the calculated speed for the preceding very small unit time period

Meanwhile, as shown in FIG. 2B, when the motor 1 is rotated in the reverse direction, the actual speed of the motor 1 is gradually reduced on the side of the forward rotation and finally, becomes zero. Thereafter, the motor 1 is gradually accelerated on the side of the reverse rotation. As shown in FIG. 2C, however, the speed data calculated in the motor control section 6 may not be zero even if the actual speed of the motor 1 becomes zero, thereby to make it difficult to detect the exact time when the motor 1 begins to rotate in the reverse direction.

In one example, therefore, it is considered that the motor 1 begins to rotate in the reverse direction when the speed data shown in FIG. 2C is not more than a predetermined reference speed, or it is judged that the motor 1 begins to rotate in the reverse direction when a predetermined very small time period Δt0 has elapsed since the speed data was not more than the reference speed so as to determine the more exact time when the motor 1 begins to rotate in the reverse direction.

Furthermore, as another example, it is considered that the motor 1 is rotated in the reverse direction at the time point where the speed data shown in FIG. 2C is not more than a predetermined reference speed Nth and the acceleration data shown in FIG. 2D is switched from the negative to the positive in such state.

Additionally, as still another example, the following are devised to calculate the acceleration data.

More specifically, the speed data actually detected by the motor control section 6 hardly becomes stepped-shaped speed data as shown in FIG. 2C. In many cases, the calculated speed data undergoes variance for each very small unit time period Δt, as shown in FIG. 2E.

Similarly, the calculated acceleration data is not data which is clearly switched from the negative to the positive at a certain time point, as shown in FIG. 2D. Actually, the acceleration data undergoes variance between the negative and the positive for each very small unit time period Δt, as shown in FIG. 2F.

According to a further example of the present invention, therefore, the acceleration data as shown in FIG. 2F is made use of by finding the average value of accelerations.

Specifically, the time point where the average value of the accelerations is switched from the negative to the positive began to rotate stored, and it is that the motors began to rotate in the reverse direction at the above described stored time point where the average value of the accelerations is switched from the negative to the positive when the average value of the accelerations continues to be positive a predetermined number of times.

Furthermore, in the above described respective examples, when it is not judged that the motor 1 is rotated in the reverse direction within a predetermined time period elapsed after the reverse rotation instruction is outputted, protection processing may be performed by considering that an abnormality occurs to improve the safety in motor control using a single-phase type encoder.

Figure 5:
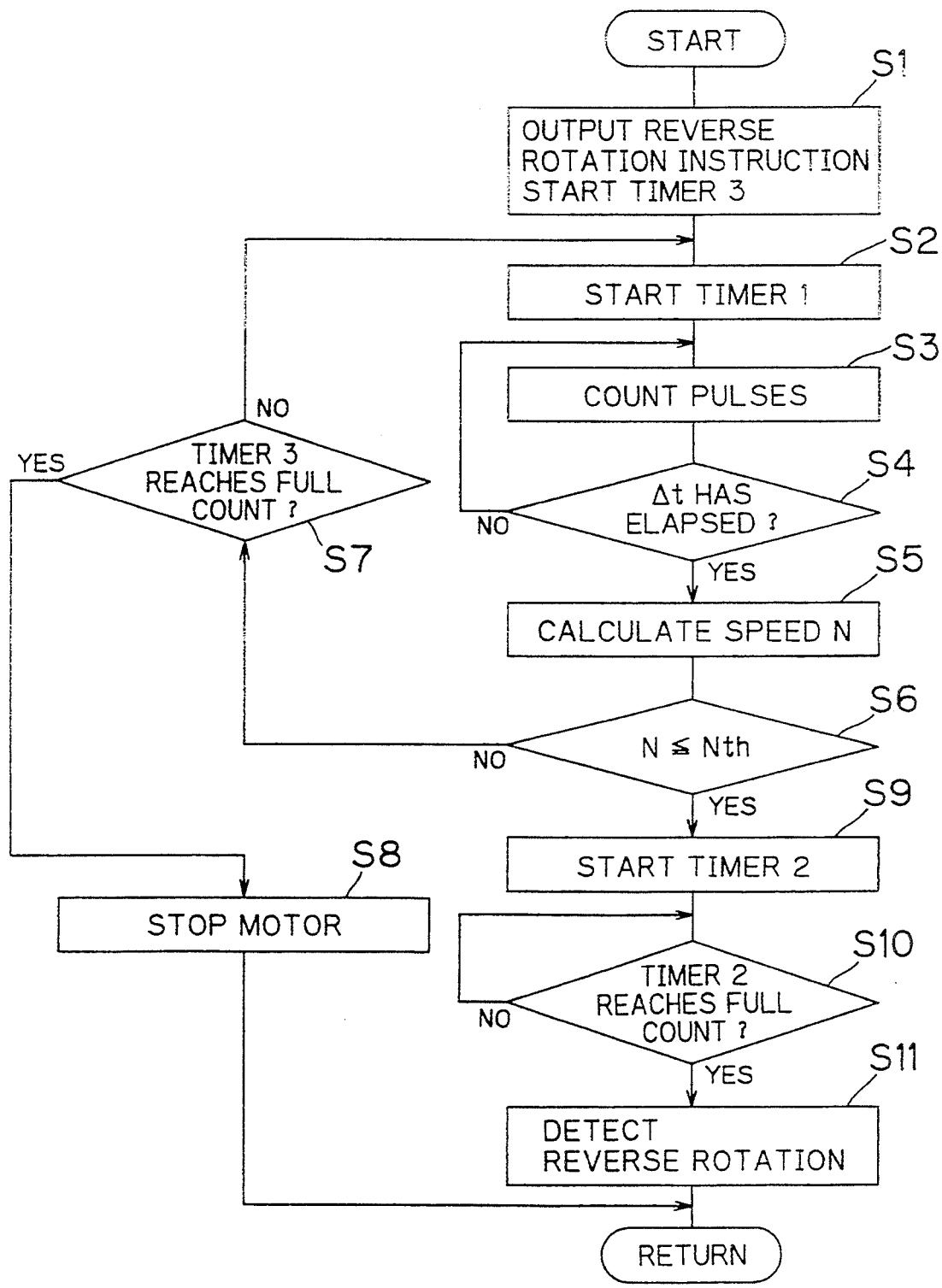
FIG. 5 is a flow chart showing the contents of control for detecting the reverse rotation of a motor according to one embodiment of the present invention.

Description is now made of one example of a control operation of the motor control section 6 with reference to a flow chart of FIG. 5.

The motor 1 is a motor for driving a conveying belt of an automatic document feeder mounted on, for example, a copying machine, and the motor control section 6 is a control section of the motor. In this case, a reverse rotation instruction is given to the motor control section 6 from a main body control section carrying out the entire control of the automatic document feeder. Correspondingly, the motor control section 6 outputs the reverse rotation instruction to the driver 7. In addition, an abnormality detecting timer 3 is started (step S1).

A timer 1 is then started (step S2). The timer 1 is for measuring a very small unit time period Δt. Pulses inputted from the photointerruptor 5 are then counted (step S3). The counting of the pulses is continued until the very small unit time period Δt has elapsed (steps S4→S3→S4).

As the counting of the pulses, the number of pulses is counted by the up counter 62, and the number of reference clock pulses during the counting is counted by the capture register 64, as described with reference to FIG. 3.

If the very small unit time period Δt has elapsed, pulse width data CWDT is found on the basis of the number of pulses (UDCn−UDCm) counted by the up counter 62 for the very small unit time period Δt and the change (CPTn−CPTm) in the counted number of the capture register 64 for the very small unit time period Δt, and the rotation speed N of the motor 1 is found on the basis of the equation (2) (step S5).

It is judged whether or not the calculated rotation speed N is not more than the reference speed Nth (step S6).

Unless the calculated rotation speed N is not more than the reference speed Nth as the result of the judgment, it is judged whether or not the timer 3 reaches the full count (step S7). The timer 3 is an abnormality detecting timer as described above. As the time period measured by the timer 3, a sufficient time period required to detect the reverse rotation is previously set by the timer 3. Therefore, the timer 3 does not reach the full count at this time point so long as it is normally operated. Consequently, the control in the step S2 and the subsequent steps is repeated, so that a speed N for the succeeding very small unit time period Δt is calculated (steps S2 to S5).

On the other hand, when it is judged in the step S7 that the timer 3 reaches the full count, that is, unless the speed N of the motor 1 is not more than the predetermined reference speed Nth even if a sufficient time period required to detect the reverse rotation of the motor 1 which is set by the timer 3 has elapsed, it is judged that an abnormality occurs, so that the motor 1 is stopped (step S8). Consequently, this control is terminated.

Meanwhile, the driving of the motor 1 may be stopped after the motor 1 continues to be rotated for a predetermined time period at a predetermined speed, for example, instead of immediately stopping the motor 1.

The present embodiment is characterized in that the protection processing of the motor 1 is performed on the basis of the fact that the timer 3 reaches the full count.

When the control of the motor 1 is normally performed, it is judged in the step S6 that the calculated rotation speed N is not more than the reference speed Nth by the time when the timer 3 reaches the full count. Consequently, a timer 2 is started (step S9). The timer 2 is a timer for measuring a predetermined very small time period Δt0.

If it is judged that the timer 2 reaches the full count by measuring the predetermined very small time period Δt0 after the timer 2 is started (step S10), it is judged that the motor 1 begins to rotate in the reverse direction at the time point (step S11).

If such control is carried out, it is the very small time period Δt0 that is measured by the timer 2. Accordingly, the time when the motor begins to rotate in the reverse direction is not detected on the basis of a relatively long time period T as in the above described Japanese Patent Laid-Open Gazette No. 174538/1986, thereby to make it possible to accurately judge the time when the motor 1 begins to rotated in the reverse direction.

Furthermore, although in the present embodiment, the timer 2 is started after the rotation speed N of the motor 1 is not more than the reference speed Nth, it is possible to consider that the motor 1 begins to rotate in the reverse direction at the time point where it is judged that the rotation speed N of the motor 1 is not more than the reference speed Nth in the step S6 by setting a threshold value for judging whether or not the speed of the motor 1 is not more than a predetermined speed (a reference speed Nth) to a sufficiently low value.

Figure 6:
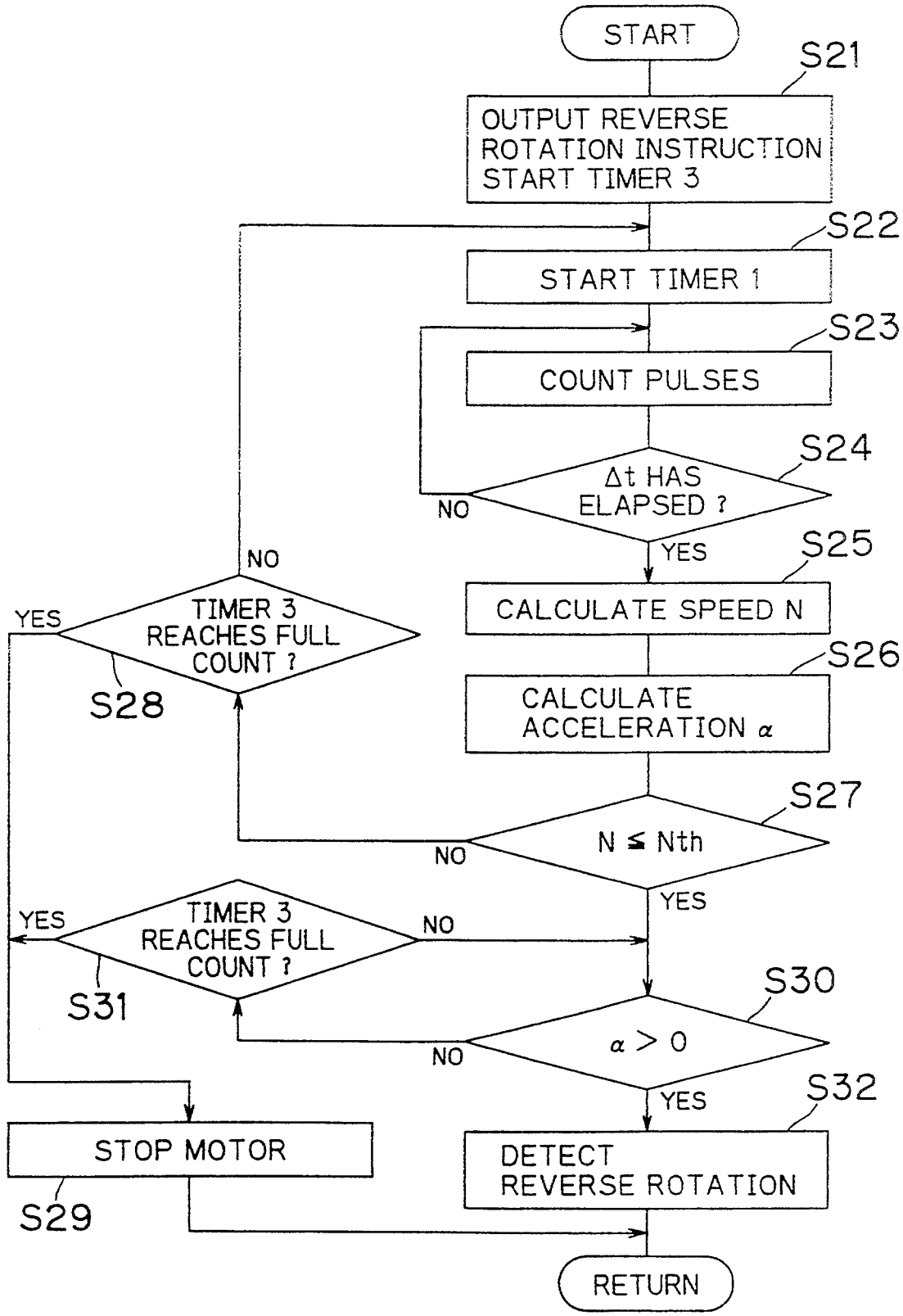
FIG. 6 is a flow chart showing the contents of control for detecting the reverse rotation of a motor according to another embodiment of the present invention.

FIG. 6 is a flow chart for explaining another control operation of the motor control section 6. In the flow chart shown in FIG. 6, an example is shown in which acceleration data is made use of for the motor control section 6 to detect the time point where the motor 1 begins to rotated in the reverse direction.

Description is made with reference to FIG. 6. If a reverse rotation instruction is given to the motor control section 6 from a main body control section carrying out the entire control of the automatic document feeder, the motor control section 6 outputs the reverse rotation instruction to the driver 7, and an abnormality detecting timer 3 is started (step S21).

A timer 1 is then started (step S22). The timer 1 is for measuring a very small unit time period Δt. Pulses inputted from the photointerruptor 5 are then counted (step S23). The counting of the pulses is continued until the very small unit time period Δt has elapsed.

As the counting of the pulses, the number of pulses is counted by the up counter 62, and the number of reference clock pulses during the counting is counted by the capture register 64, as described with reference to FIG. 3.

If the very small unit time period Δt has elapsed, pulse width data CWDT is found on the basis of the number of pulses (UDCn−UDCm) counted by the up counter 62 for the very small unit time period Δt and the change (CPTn−CPTm) in the counted number of the capture register 64 for the very small unit time period Δt, and the rotation speed N of the motor 1 is found on the basis of the equation (2) (step S25).

Furthermore, an acceleration α for the very small unit time period Δt is calculated (step S26). The acceleration α is found by the foregoing equation (3).

It is judged in the subsequent step S27 whether or not the rotation speed N calculated in the step S5 is not more than the reference speed Nth. Unless the calculated speed N is not more than the reference speed Nth as the result of the judgment, it is judged whether or not the timer 3 reaches the full count (step S28).

The timer 3 is an abnormality detecting timer, as described above, and is for measuring a sufficient time period required to detect the reverse rotation of the motor 1. Therefore, the timer 3 does not reach the full count at this time point in the normal state. Consequently, the control in the step S22 and the subsequent steps is repeated, so that a speed N for the subsequent very small unit time period Δt is calculated, and an acceleration α for the very small time period is found (steps S22 to S26).

If it is judged in the step S28 that the timer 3 reaches the full count, that is, unless the speed N of the motor 1 becomes not more than the reference speed Nth within a sufficient time period required to detect the reverse rotation of the motor 1, it is judged that an abnormality occurs, so that the motor 1 is stopped (step S29).

In the present embodiment, the motor 1 is so controlled as to be immediately stopped as a protecting operation on the basis of the fact that the timer 3 reaches the full count.

The motor 1 may be stopped after being driven for a predetermined time period at a predetermined low speed instead of immediately stopping the motor 1.

In the normal control, it is judged in the step S27 that the calculated rotation speed N is not more than the reference speed Nth by the time when the timer 3 reaches the full count. Consequently, it is judged whether or not the acceleration α becomes positive (step S30). The acceleration α is negative while the motor 1 is being decelerated, while being switched to the positive if the motor 1 starts to be accelerated, as shown in FIG. 2D. Consequently, if the acceleration α is not positive, that is, if the acceleration α is negative, the motor 1 is not rotated in the reverse direction, that is, the motor 1 is being decelerated.

When the acceleration α is not positive, it is then judged whether or not the timer 3 reaches the full count (step S31). If the acceleration α does not become positive by the time when the timer 3 reaches the full count, which means that the reverse rotation of the motor 1 is not detected within a sufficient time period required to detect the reverse rotation, it is judged that an abnormality occurs, so that the motor 1 is stopped (step S29).

In the normal state, it is judged in the step S31 that the timer 3 does not reach the full count, so that the reverse rotation of the motor 1 is detected (step S32) at the time point where the acceleration α becomes positive in the step S30.

Figure 7:
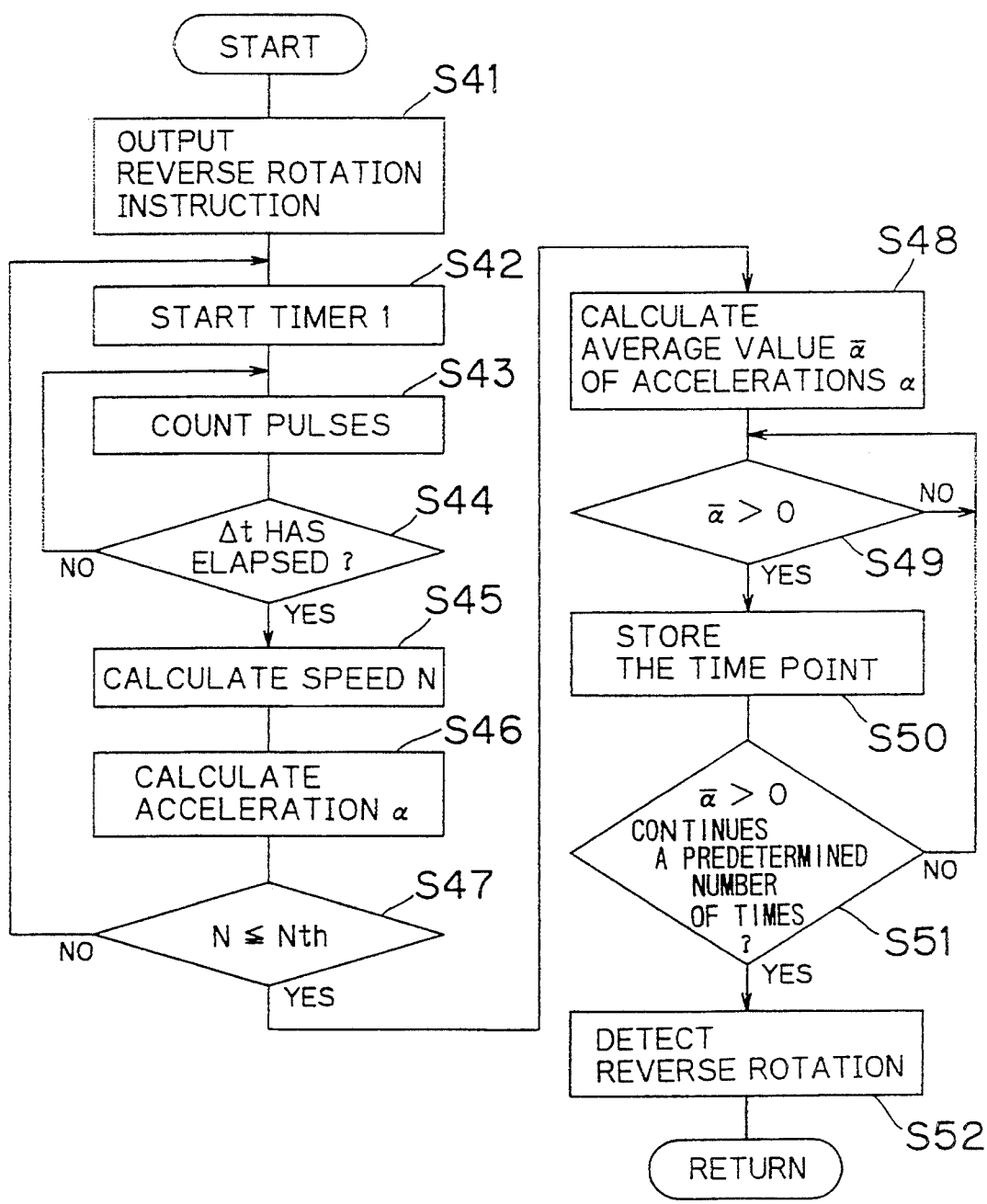
FIG. 7 is a flow chart showing the contents of control for detecting the reverse rotation of a motor according to still another embodiment of the present invention.

FIG. 7 is a flow chart showing the contents of control for detecting the reverse rotation of a motor according to still another embodiment of the present invention.

Description is made with reference to FIG. 7. A reverse rotation instruction is given to the motor control section 6 from a main body control section carrying out the entire control of the automatic document feeder. Correspondingly, the motor control section 6 outputs the reverse rotation instruction to the driver 7 (step S41).

Furthermore, a timer 1 is started (step S42). The timer 1 is for measuring a very small unit time period Δt. Pulses inputted from the photointerruptor 5 are then counted (step S43). The counting of the pulses is continued until the very small unit time period Δt has elapsed (step S44→S43→S44).

As the counting of the pulses, the number of pulses is counted by the up counter 62, and the number of reference clock pulses during the counting is counted by the capture register 64, as described with reference to FIG. 3.

If the very small unit time period Δt has elapsed, pulse width data CWDT is found on the basis of the number of pulses (UDCn−UDCm) counted by the up counter 62 for the very small unit time period Δt and the change (CPTn−CPTm) in the counted number of the capture register 64 for the very small unit time period Δt, and the rotation speed N of the motor 1 is found on the basis of the equation (2) (step S45).

Furthermore, an acceleration α for the very small unit time period Δt is calculated (step S46). The acceleration α is found by the foregoing equation (3).

It is judged in the subsequent step S47 whether or not the rotation speed N calculated in the step S45 is not more than a reference speed Nth. Unless the calculated rotation speed N is not more than the reference speed Nth as the result of the judgment, the control in the step S42 and the subsequent steps is repeated, so that a speed N for the subsequent very small unit time period Δt is calculated, and an acceleration α for the very small unit time period is found (steps S42 to S46).

If it is judged in the step S47 that the calculated rotation speed N is not more than the reference speed Nth, the average value of accelerations α is then calculated (step S48). In calculating the average value of accelerations α, the average value of accelerations for a predetermined number of very small unit time periods Δt including the newest acceleration is calculated. For example, the average value of accelerations for three very small unit time periods including the newest acceleration α is calculated.

It is then judged whether or not the calculated average value of the accelerations is positive (step S49). The average value of the accelerations is negative while the motor 1 is being decelerated, while being switched to the positive if the motor 1 starts to be accelerated, as shown in FIG. 2F. Consequently, unless the average value of the accelerations is positive, the motor is being decelerated.

If it is judged in the step S49 that the average value of the accelerations is positive, the time point where the judgment is made is then stored (step S50). Thereafter, it is judged whether or not the average value of the accelerations continues to be positive a predetermined number of times, for example, two times (step S51). If the average value of the accelerations continues to be positive, for example, two times, it is judged that the time point stored in the step S50 is the time point where the motor 1 began to rotate in the reverse direction (step S52).

Furthermore, unless the average value of the accelerations continues to be positive a predetermined number of times in the step S51, the control in the step S49 and the subsequent steps is repeated.

Also in the control described with reference to FIG. 7, the abnormality detecting timer 3 may be provided as in the control shown in FIG. 5 or 6 so that it is judged that an abnormality occurs by the fact that the timer 3 reaches the full count before the reverse rotation of the motor 1 is detected, to stop the motor 1. Consequently, in a case where the time point where the motor is actually begins to rotate in the reverse direction is detected by a single-phase type encoder only outputting pulses in synchronism with the rotation of the motor, even if there occurs the situation where the reverse rotation of the motor is not detected, a reverse rotation voltage can be prevented from being continuously applied to the motor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for controlling reverse rotation of a motor said apparatus comprising:
    rotation signal outputting means connected to a rotation axis of a motor for outputting a rotation signal in synchronism with rotation of the motor;
    speed calculation means for calculating rotation speed of the motor based on a rotation signal outputted by the rotation signal outputting means;
    means for applying a reverse rotation instruction to the motor;
    judging means for judging, after a reverse rotation instruction has been applied to the motor by the applying means, whether or not the rotation speed of the motor as calculated by the speed calculating means is not more than a predetermined reference speed; and reverse rotation detecting means for detecting that the motor has begun to rotate in a reverse direction when a predetermined very small time period has elapsed after the judging means has judged that the rotation speed of the motor is not more than the reference speed.

2. An apparatus for controlling reverse rotation of a motor according to claim 1, wherein
said rotation signal outputting means includes single-phase encoding means for outputting pulses of one type every time the rotation axis of the motor is rotated through a very small angle.

3. An apparatus for controlling reverse rotation of a motor according to claim 2, further comprising
abnormality processing means for stopping the motor when the reverse rotation detecting means has not detected the time when the motor actually began to rotate in the reverse direction within a predetermined time period after the applying means applied its reverse rotation instruction.

4. An apparatus for controlling reverse rotation of a motor said apparatus comprising:
rotation signal outputting means connected to a rotation axis of a motor for outputting a rotation signal in synchronism with rotation of the motor, said rotation signal outputting means including single-phase encoding means for outputting pulses of one type every time the rotation axis of the motor is rotated through a very small angle;
speed calculation means for calculating rotation speed of the motor based on a rotation signal outputted by the rotation signal outputting means;
means for applying a reverse rotation instruction to the motor;
judging means for judging, after a reverse rotation instruction has been applied to the motor by the applying means, whether or not the rotation speed of the motor as calculated by the speed calculating means is not more than a predetermined reference speed; and
reverse rotation detecting means for detecting that the motor has begun to rotate in a reverse direction after the judging means has judged that the rotation speed is not more than the reference speed.

5. An apparatus for controlling reverse rotation of a motor according to claim 4, further comprising
abnormality processing means for stopping the motor when the reverse rotation detecting means has not detected the time when the motor actually began to rotate in the reverse direction within a predetermined time period after the applying means applied its reverse rotation instruction.

6. An apparatus for controlling reverse rotation of a motor, said apparatus comprising:
rotation signal outputting means connected to a rotation axis of a motor for outputting a rotation signal in synchronism with rotation of the motor;
speed calculating means for calculating rotation speed of the motor on the basis of a rotation signal outputted by the rotation signal outputting means;
acceleration calculating means for calculating acceleration of the motor on the basis of a rotation signal outputted by the rotation signal outputting means;
means for applying a reverse rotation instruction to the motor;
judging means for judging, after a reverse rotation instruction has been applied the motor by the applying means, whether or not the rotation speed of the motor as calculated by the speed calculating means is not more than a predetermined reference speed; and
reverse rotation detecting means for detecting the acceleration calculated by the acceleration calculating means after the judging means judges that the rotation speed is not more than the reference speed, and judging that the motor has begun to rotate in a reverse direction when the acceleration switches from negative to positive.

7. An apparatus for controlling reverse rotation of a motor according to claim 6, wherein
the rotation signal outputting means includes single-phase encoding means for outputting pulses of one type every time the rotation axis of the motor is rotated through a very small angle.

8. An apparatus for controlling reverse rotation of a motor according to claim 7, further comprising
abnormality processing means for stopping the motor when the reverse rotation detecting means has not detected the time when the motor actually began to rotate in the reverse direction within a predetermined time period after the applying means applied its reverse rotation instruction.

9. An apparatus for controlling reverse rotation of a motor, said apparatus comprising:
rotation signal outputting means connected to a rotation axis of a motor for outputting a rotation signal in synchronism with rotation of the motor;
speed calculating means for calculating rotation speed of the motor on the basis of rotation signal outputted by the rotation signal outputting means;
acceleration calculating means for calculating an acceleration of the motor for a predetermined very small unit time period on the basis of a rotation signal outputted by the rotation signal outputting means;
means for applying a reverse rotation instruction to the motor;
judging means for judging, after a reverse rotation instruction has been applied to the motor by the applying means, whether or not the rotation speed of the motor as calculated by the speed calculating means is not more than a predetermined reference speed; and
reverse rotation detecting means for averaging a predetermined number of accelerations calculated by the acceleration calculating means for a predetermined interval to find an average value of the accelerations, after the judging means has judged that the rotation speed is not more than the reference speed, the reverse rotation detecting means storing a time when the average value of the accelerations switches from negative to positive, and the reverse rotation detecting means detecting that the motor began to rotate in a reverse direction at the stored time if the average value of the accelerations has continued to be positive a predetermined number of times.

10. An apparatus for controlling reverse rotation of a motor according to claim 9, wherein
said rotation signal outputting means includes single-phase type encoding means for outputting pulses of one type every time the rotation axis of the motor is rotated through a very small angle.

11. An apparatus for controlling reverse rotation of a motor according to claim 10, further comprising abnormality processing means for stopping the motor when the reverse rotation detecting means has not detected the time when the motor actually began to rotate in the reverse direction within a predetermined time period after the applying means applied its reverse rotation instruction.

12. A method of judging when a motor actually begins to rotate in reverse direction, said method comprising the steps of:

detecting, after a reverse rotation instruction is given to a rotating motor, a number of pulses for each very small unit time period, said pulses being outputted in synchronism with rotation of the rotating motor; and judging when the motor actually begins to rotate in a reverse direction based on when the number of pulses detected in said detecting step becomes not more than a predetermined number.

* * * * *